US006391136B1

(12) United States Patent
Stickelbrocks

(10) Patent No.: US 6,391,136 B1
(45) Date of Patent: May 21, 2002

(54) METHOD OF REMOVING UNITS FROM LAMINATE WEBS WHICH HAVE A MULTIPLICITY OF UNITS

(75) Inventor: Karl Stickelbrocks, Freising (DE)

(73) Assignee: X-ident GmbH (DE)

( * ) Notice: Subject to any disclaimer, the term of this patent is extended or adjusted under 35 U.S.C. 154(b) by 0 days.

(21) Appl. No.: 09/374,587

(22) Filed: Aug. 13, 1999

(30) Foreign Application Priority Data

Nov. 18, 1998 (DE) .......................................... 98121920

(51) Int. Cl.[7] ............................ B32B 31/00; B32B 9/06

(52) U.S. Cl. .................... 156/249; 156/247; 156/304.3; 156/344; 428/40.1; 428/42.3

(58) Field of Search ................................ 156/247, 249, 156/344, 541, 584, 304.3; 428/40.1, 42.2, 42.3

(56) References Cited

U.S. PATENT DOCUMENTS 4,032,679 A * 6/1977 Aoyagi ...................... 428/42.3
4,390,388 A 6/1983 Nagata et al. .............. 156/351
4,446,183 A * 5/1984 Savagian ................... 428/42.3
5,230,938 A * 7/1993 Hess et al. ................. 428/42.3
5,824,379 A * 10/1998 Riley et al. ................ 428/40.1
6,136,129 A * 10/2000 Petkovsek .................. 156/247

FOREIGN PATENT DOCUMENTS

DE 23 65 807 10/1976
DE 27 14 854 10/1978
EP 595549 A2 * 5/1994

* cited by examiner

*Primary Examiner*—Mark A. Osele
(74) *Attorney, Agent, or Firm*—Baker & Daniels

(57) ABSTRACT

Method of removing units (2) from laminate webs (1) which have a multiplicity of units (2,2*a*,2*b*) which are arranged adjacent to one another in the web direction and can be separated from one another at predetermined separating locations (3,3*a*,3*b*) arranged transversely to the web-running direction, and of reproducing continuous laminate webs (1), it being the case that the laminate webs (1) have a substrate layer (4) and, on the top side of the latter, a multiplicity of labels, tags or admission passes (5) which can be detached therefrom and, together with the substrate layer (4), form a unit (2), and the substrate layer (4) has at least one additional, prepared separating line (6) which is offset in the web-running direction in relation to the predetermined separating locations (3,3*a*,3*b*) of the laminate webs (1) and is arranged transversely to the web-running direction.

8 Claims, 1 Drawing Sheet

METHOD OF REMOVING UNITS FROM LAMINATE WEBS WHICH HAVE A MULTIPLICITY OF UNITS

The invention relates to a method of removing units, in particular defective units, from detachably connected layers of material webs, from endless strips or laminate webs which have a multiplicity of units, and also relates to embodiments of laminate webs, in particular those from which defective units have essentially been removed.

PRIOR ART

In the prior art, labels or tags are produced in the form of an endless strip with prepared separating locations. Such endless strips are produced in certain roll or stack quantities, e.g. with zigzag folding. It is frequently the case in the production of such endless strips that many of the individual units, e.g. labels or tags, are defective.

Among the overall number of usable units of a roll or of a stack, a predetermined number of defective units is not to be exceeded. This may be necessary, in particular, for samples, for tests or else for series production. If, during production, the predetermined number of defective units is exceeded, the roll or the stack is not accepted, or bought, by the customer.

If, for example, labels, tags or components such as electronic identification components, e.g. RFID transponders, chips and the like, are integrated in the separable units of endless webs, in the case of which a plurality of layers are laminated to give a detachable composite arrangement, it is not possible to rule out the situation where, during the integration and subsequent finishing-off operation, some of the initially operable identification components become inoperable and this results in defective units in endless webs, with the result that said units have to be removed from the web and the endless webs have to be reproduced. This requires the formation of so-called adhesive locations. The formation of adhesive locations has been practiced in various ways in the paper industry for decades.

Endless webs of labels or tags, e.g. self-adhesive labels, or tags provided with pressure sensitive adhesive, usually have prepared and marked predetermined separating locations between the individual units, in order for individual units easily to be formed from the endless web during use.

DESCRIPTION OF THE INVENTION

The object of the invention is to provide a design of predetermined separating locations between units in endless laminate webs of labels, tags or admission passes which permits individual units to be separated out of the web and the endless web to be reproduced in a straightforward manner, and to present a method of removing units and of reproducing the web.

This object is achieved by a method of removing units from laminate webs which have a multiplicity of units which are arranged adjacent to one another in the web direction and can be separated from one another at predetermined separating locations arranged transversely to the web-running direction, and of reproducing continuous laminate webs, it being the case that the laminate webs have a substrate layer and, on the top side of the latter, a multiplicity of labels, tags or admission passes which can be detached therefrom and, together with the substrate layer, form a unit, and the substrate layer has at least one additional, prepared separating line which is offset in the web-running direction in relation to the predetermined separating locations of the laminate webs and is arranged transversely to the web-running direction, said method being implemented by (i) the substrate layer of a unit which is to be removed being severed along the additional, offset separating line and that end of the substrate layer which is connected to the first adjacent unit being detached from the label, tag or admission pass as far as the predetermined separating location between the unit which is to be removed and the first adjacent unit, (ii) by the substrate layer being severed along the offset, additional separating line of the second adjacent unit, at the other end of the unit which is to be removed, and by that end of the substrate layer which is connected to the unit which is to be removed being detached from the label, tag or admission pass of the second adjacent unit as far as the predetermined separating location between the unit which is to be removed and the second adjacent unit, it also being possible for the steps (i) and (ii) to be carried out in reverse order, (iii) by the unit which is to be removed being separated off from the laminate web at the predetermined separating location between the unit which is to be removed and the first adjacent unit, with the result that the substrate layer projects beyond the end of the first adjacent unit, (iv) by the unit which is to be removed being separated off from the laminate web at the predetermined separating location between the unit which is to be removed and the second adjacent unit, with the result that the label, the tag or admission pass of the second adjacent unit projects beyond the end of the substrate layer, it also being possible for the steps (iii) and (iv) to be carried out in reverse order, or it also being possible for the unit which is to be removed to be separated off from the respectively adjacent unit, at the predetermined separating location between the unit which is to be removed and the respectively adjacent unit, even just following the respective detachment of the end of the substrate layer according to (i) or (ii), (v) by the top side of that piece of the substrate layer which projects beyond the end of the first adjacent unit being joined together with the substrate-layer side of that piece of the label, tag or admission pass of the second adjacent unit which projects beyond the end of the substrate layer, in order for a continuous laminate web to be formed again from the separated parts.

The solution often includes the design of a laminate web which has a multiplicity of units which are arranged adjacent to one another in the web-running direction and can be separated from one another at predetermined separating locations arranged transversely to the web-running direction, it being the case that the laminate web has a substrate layer and, on the top side of the latter, a multiplicity of labels, tags or admission passes which can be detached therefrom and in which there is integrated in each case one magnetic or electronic storage element which can be provided, by contact or in a contact-free manner, with data which can be stored and retrieved again, and the labels, tags or admission passes, together with the substrate layer, form a unit, and the substrate layer has at least one additional, prepared separating line which is offset in the web-running direction in relation to the predetermined separating locations of the laminate web, is arranged transversely to the web-running direction and is formed in the substrate layer as a perforation or non-continuous cut.

The dependent claims deal with particularly advantageous embodiments of the invention.

The method according to the invention has the advantage that units, for example defective units, can be removed from the laminate webs without any great difficulty, and the split in a laminate web is connected by the remaining, neighboring units such that there is no thickened adhesive location following removal of a unit. The method according to the invention makes it possible to obtain laminate webs which contain 3% of defective units or less, preferably 1% of defective units or less.

The operations of detaching the label, tag or admission pass from the substrate layer and joining the layers together again may well reduce the adhesion of the label, tag or admission pass on the substrate layer, but in most cases this has so little effect, in the region of the adhesive location, on the tensile strength of the laminate web in the web-running direction that this formation of the adhesive location is accepted by the users of the webs of labels, tags or admission passes.

DETAILED DESCRIPTION OF THE INVENTION

Figure 1:
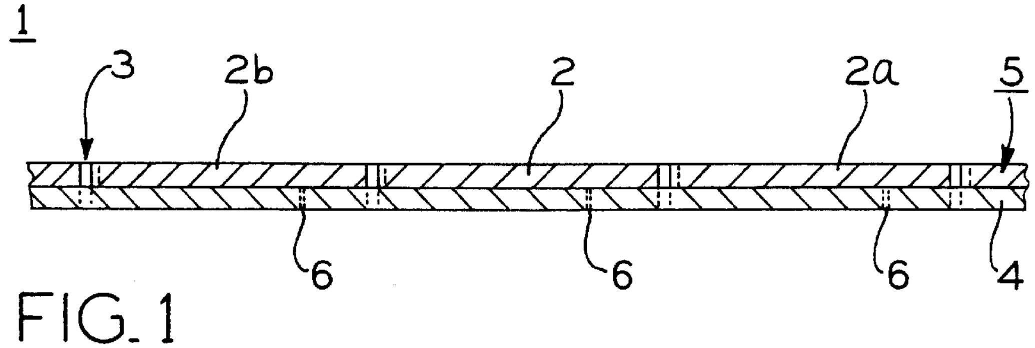
FIG. 1 is a longitudinal sectional view of a laminate web in accordance with the present invention.

The predetermined separating locations between the units of the laminate web may be formed in different ways. For example, perforations may be provided in the laminate web between adjacent units, transversely to the web-running direction, these perforations rendering the predetermined separating locations visible and making it easier for individual units to be separated off.

It is preferable for the individual labels, tags or admission passes to be arranged separately on the substrate layer rather than directly neighboring one another, with the result that adjacent labels, tags or admission passes are spaced apart from one another on the substrate layer. At such predetermined separating locations, the thickness of the laminate web decreases, preferably to the thickness of the substrate layer, with the result that the predetermined separating locations and the ends of the individual units are easily visible. In order to assist the severing of the substrate layer at such predetermined separating locations, the substrate layer may additionally be perforated and/or have punched holes. Such a formation of the predetermined separating locations is particularly preferred if the laminate web is to have attachment points for web-conveying elements and/or if the laminate web is to be produced to give stacks with zigzag folding.

The at least one additional separating line, which is offset in the web-running direction in relation to the predetermined separating locations of the laminate web between the units and is prepared just in the substrate layer, transversely to the web-running direction, may be a perforation of the substrate layer or a cut which extends over parts of the substrate layer or over the entire thickness thereof. It is particularly preferred to perforate the substrate layer or to form a non-continuous cut, because otherwise, at this location, the laminate web is held together in the web-running direction just by the label, the tag or admission pass. This manner of holding together in the web-running direction is usually sufficient. Moreover, the avoidance of a continuous cut has the advantage that it is possible to detect the removal of units from the web according to the invention following the splicing operation, because perforations or non-continuous cuts in the substrate layer are severed in the case of the method according to the invention.

If more than one additional separating line is provided in the substrate layer, for example if two or more additional separating lines are provided therein, respectively corresponding additional separating lines in the substrate layer beneath the labels, tags or admission passes should be severed in the case of the removal of units according to the invention, in order to make it easier for the parts of the laminate web to be joined together correctly. If appropriate, one of a plurality of additional separating lines prepared in the substrate layer beneath the labels, tags or admission passes in each case may be specifically marked, in order for corresponding separating lines to be easier to detect.

The substrate layer may be made of paper, a plastic film, a metal foil or of nonwoven material. The top side of the substrate layer is preferably provided with a release agent, in order for labels or tags to be fastened detachably thereon by means of a self-sticking adhesive.

Examples of suitable release agents are polyorganosiloxanes, vinyl ethers, maleic anhydride copolymers, cellulose acetate, (meth)acrylates, polyethylene waxes, vinyl chloride/vinyl acetate copolymers, vinyl esters with long-chain alcohols, chromium stearates and mixtures of such release agents.

If plastic films are used as the substrate material, sometimes the release action of the plastic material itself is sufficient in order for labels or tags with a self-sticking adhesive on the underside to be fastened detachably on the substrate layer.

The labels or tags may be made of conventional materials such as paper, plastic and textile material and may themselves be laminates comprising a plurality of layers and/or materials. In the case of tags, these materials may be reinforced by the incorporation of reinforcing fibers.

In the case of textile labels, these may also be fastened detachably on the substrate layer by a so-called touch-and-close fastener. In such a case, the top side of the substrate layer and the underside of the labels have the elements of the touch-and-close fastener.

If, instead of labels, for example admission passes, such as entry tickets, are formed as the endless laminate webs, it is preferred for the rear side of the detachable admission passes to be provided with a release agent and for a self-sticking adhesive to be arranged on the top side of the substrate layer, in order to form, in the laminate web, units in the case of which the admission passes are fastened detachably on a substrate layer. It is possible to use as the self-sticking adhesive the known adhesives which are customary for this purpose.

Particularly preferred labels, tags or admission passes are so-called intelligent labels, tags or entry tickets in which there is integrated a magnetic or electronic storage element which can be interrogated by contact or in a contact-free manner.

So-called RFID transponders are examples of storage elements which can be provided, in a contact-free manner, with data which is to be stored and can be interrogated again. Such transponders are described in U.S. Pat. Nos. 4,475,481, 4,730,188 or U.S. Pat. No. 4,857,893, the contents of which are included here. The identification system described in U.S. Pat. 4,475,481 uses such transponders which are known in principle and are commercially available. The latter contain an inductive antenna coil which is arranged such that it couples electromagnetic flow (energy) in the form of an interrogation signal from an external interrogation device, along with an excitation frequency into the transponder, and also contains a semiconductor chip with a circuit which functions both as a rectifier circuit and as a mating contact modulator circuit and with a programmable matrix antenna control logic circuit (ID storage circuit), in order to produce a frequency swing, serially coded in modulated wave form in accordance with data programmed in the matrix circuit. The semiconductor diode rectifies the substrate signal obtained from the antenna coil, in order to produce the operating voltage for the transponder, and receives coded data contained in the substrate signal, in order to produce response signals, which are transmitted from the transponder to the interrogation unit via the antenna.

It is particularly preferred to integrate in labels, tags or entry tickets a transponder which is fastened on a thin flexible substrate on which is formed the antenna, which is connected electrically to the chip. This antenna has a conductive coil formed on the substrate and also has first and second electrical antenna contact points, it being the case that the transponder circuit chip has a first and second electrical chip contact points on an inner surface-area part of the chip and the electrical connection of the chip to the antenna is produced by means of electrically conductive adhesive which is arranged between the antenna connection points and the chip connection points. The antenna has a plurality of turns which consist of an electrically conductive material and are formed by conventional measures on a dielectric polymer substrate.

The RFID transponder, preferably fastened on a flexible substrate, with electrically connected antenna may be arranged at different locations of the label, tag or of the admission pass, in order to form separable units in the laminate web. Preferred locations are those at which the front side of the label, tag or of the admission pass is not required for information which may be applied and read optically, for example details of contents and purpose and, in the case of goods for transportation, for example sender's details, receiver's address, instructions for shipping and the like, in order to avoid the situation where the subsequent application of such information may impair the ability of the RFID transponder to operate. The transponder may be integrated in the self-adhesive rear side of the label or tag and is then covered by the substrate layer of the laminate web as a liner layer. Such a tag is known, for example, from EP-A-595 549, the contents of which are included here.

In the case of admission passes, the latter or parts thereof may be designed as a multi-layered laminate, in order to make it easier to integrate the storage element.

The method according to the invention is particularly advantageous for such intelligent labels, tags or admission passes because it makes it possible, within the context of finishing off to give marketable forms as rolls or stacks with zigzag folding, for the labels, tags or admission passes with inoperable storage elements or RFID transponders to be removed as units from the laminate web and for the endless laminate web to be reproduced. This means that it is possible for the proportion of defective units in the laminate webs to be reduced to the tolerance limit desired by the end users, for example to set 3% or 1% or less as the predetermined defect quota permissible. It may possibly be sufficient for defective units to be marked out such that they can be detected, and separated out, during end use. Such webs then contain marked-out, defective units and the tolerance limit may then relate to defective units which have not been marked out.

Marketable forms, such as rolls or stacks, contain the number of units which are desired in each case by end users, for example 100 or more units.

If a marking of the individual units of the laminate web is provided, it may preferably comprise printed-on letters or other symbols, e.g. a bar code. However, it may also comprise, for example, a printed-on magnetic marking or such markings which can be detected by UV light, visible light or IR light.

With self-sticking adhesive on the rear side, such labels of the units may, following detachment from the substrate layer or backing web of the laminate web, be used as stickers for marking an object. Such a sticker may be used, for example, for goods for transportation.

In order to explain the invention in more detail, an exemplary embodiment for the method according to the invention is described hereinbelow with reference to the drawings.

FIGS. 1 and 2 show a longitudinal section through the laminate webs 1 and schematically show the steps of the method according to the invention.

The laminate web 1 has a substrate layer 4, and labels, tags or admission passes 5 are fastened detachably on the top side thereof. The individual units 2,2*a*,2*b* can be separated from one another at predetermined separating locations 3, and the unit 2 can itself likewise be separated into substrate layer 4 and label/tag 5. The additional separating lines in the substrate layer 4, which are offset in the web-running direction in relation to the predetermined separating locations, beneath the labels/tags/admission passes are designated by 6. In FIG. 1, the unit which is to be removed is designated by 2, the first adjacent unit is designated by 2*a* and the second adjacent unit is designated by 2*b*.

Figure 2A:
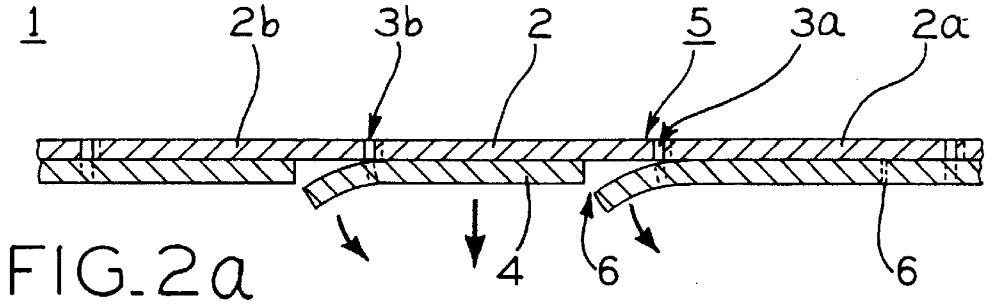
FIG. 2*a* is a sectional view of the laminate web showing a portion of a substrate removed from a label, tag, or admission pass.
Figure 2B:
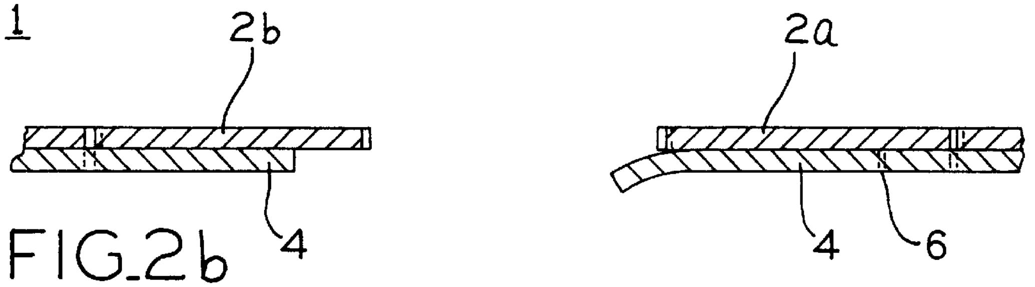
FIG. 2*b* is a sectional view of the laminate web showing a section of the laminate web removed.
Figure 2C:
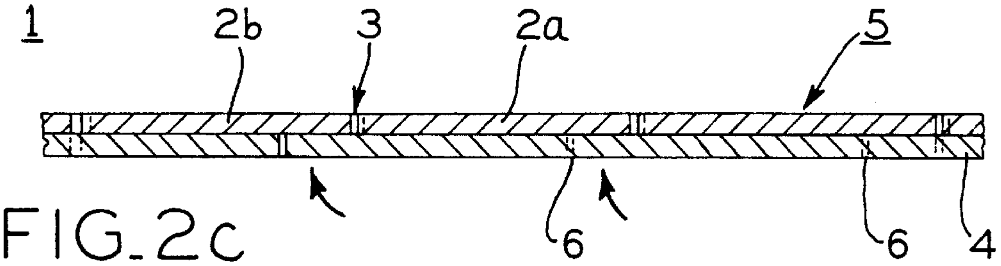
FIG. 2*c* is a sectional view of the laminate web showing the reassembled web.

FIGS. 2*a*, 2*b* and 2*c* schematically show the steps for removing the unit 2 from the laminate web 1. First of all, the substrate layer 4 of the unit 2 which is to be removed is severed beneath the label, tag or admission pass 5 and is detached from the label, tag or admission pass 5 as far as the predetermined separating location 3*a* between the unit 2 which is to be removed and the first adjacent unit 2*a*. Then the substrate layer 4 is severed at the additional separating line 6 beneath the label, tag or admission pass 5 of the second adjacent unit 2*b*, and the substrate layer 4 of the second adjacent unit 2*b* is detached from the label, tag or admission pass as far as the predetermined separating location 3*b*. It is also possible for the operations of severing and detaching the substrate layer 4 at the additional, offset separating lines 6 to be carried out in reverse order. Then the unit 2 which is to be removed is removed from the laminate web 1 by the predetermined separating locations 3*a* and 3*b* between the labels, tags or admission passes 5 of the adjacent units 2*a* and 2*b* and the unit 2 which is to be removed being severed, with the result that the endless laminate web is split into two parts, as is represented in FIG. 2*b*. It is also possible, in principle, for the operation of splitting the laminate web into two parts even to be carried out just following the severing operation of one of the two additional, offset separating lines 6. Such a step sequence is particularly preferred if the labels, tags or admission passes 5 are already separated and spaced apart from one another on the substrate layer 4 in the web-running direction, because, in the case of this embodiment of the laminate web, the predetermined separating locations 3 in the layer of the labels, tags or admission passes 5 have already been severed by the operation of separating the labels, tags or admission passes 5. The operation of detaching the substrate layer 4, beginning from the additional separating lines 6 and extending to the predetermined separating locations 3*a* and/or 3*b* already severed in the layer of the labels, tags or admission passes 5, splits the laminate web 1 into parts. In the case of this step sequence, the unit 2 which is to be removed initially still adheres to part of the laminate web and can only be separated off from one end of the laminate web 1 following the severing operation of the substrate layer 4 at the second additional separating line 6 and detachment from the label, tag or admission pass 5 of the unit 2 or 2*b,* in order to achieve the intermediate state shown in FIG. 2*b*.

In order to reproduce the endless laminate web from the parts, the underside of the label, tag or admission pass 5 of the second adjacent unit 2*b* is brought into adhesion-forming contact with the top side of the projecting piece of the substrate layer 4 of the first adjacent unit 2*a,* as is represented in FIG. 2*c*. This method of forming an "adhesive location" following removal of a unit from a laminate web of the type described has the advantage that it can only be detected by specific monitoring, on account of the substrate layer which, in comparison with the original formation of the separating lines, has been completely severed at these locations.

The invention will be explained further with reference to examples. The examples are intended merely as explanatory measures and are not intended to be restricted.

EXAMPLE 1

In a laminate web comprising paper labels which are intended for goods for transportation and on the rear side of which a self-sticking adhesive layer is arranged, RFID transponders being integrated in the labels between the paper and pressure-sensitive-adhesive layer, and also comprising a substrate layer made of release paper treated with polyorganosiloxanes, predetermined separating locations are formed between the units (label on substrate layer) in each case by virtue of perforation carried out transversely to the web-running direction. In a manner offset in the web-running direction in relation to the predetermined separating locations, an additional separating line is formed in each unit, in the release paper serving as substrate layer, beneath each label by virtue of perforation carried out transversely to the web-running direction.

When the web is finished off to give stacks with zigzag folding, the laminate web runs through a reading unit for the RFID transponder, and labels with inoperable RFID transponders are marked out for the removal of said units from the web. Using the method steps according to the invention, the marked-out units are then removed from the web and the split web is joined together again.

The step sequence is (i), (iii), (ii), (iv) and (v) or (ii), (iv), (i), (iii) and (v).

EXAMPLE 2

In a laminate web comprising paper admission passes (entry tickets), the rear side of which has a release property in relation to self-sticking adhesives by virtue of treatment with polyorganosiloxanes, RFID transponders being integrated in the admission passes, and also comprising a substrate layer made of paper coated with self-sticking adhesive, predetermined separating locations are formed between the units (admission pass on substrate layer) in each case by virtue of perforation carried out transversely to the web-running direction. In a manner offset in the web-running direction in relation to the predetermined separating locations, an additional separating line is formed in each unit, in the adhesive-coated paper serving as substrate layer, beneath each admission pass by virtue of perforation carried out transversely to the web-running direction.

When the web is finished off to give stacks with zigzag folding or rolls, the laminate web runs through a reading unit for the RFID transponder, and admission passes with inoperable RFID transponders are marked out for the removal of said units from the web. Using the method steps according to the invention, the marked-out units are then removed from the web and the split web is joined together again.

The step sequence is (i), (iii), (ii), (iv) and (v) or (ii), (iv), (i), (iii) and (v). The webs obtained in this way have less than 1% of defective units.

EXAMPLE 3

In a laminate web comprising paper luggage tags, on the rear side of which a self-sticking adhesive layer is provided, RFID transponders being integrated in the luggage tags between the paper and pressure-sensitive-adhesive layer, and also comprising a substrate layer made of release paper treated with polyorganosiloxanes, the luggage tags are arranged separately in the web-running direction. Predetermined separating locations are formed between the units (luggage tag on substrate layer) in the substrate layer, at the locations not covered by the luggage tags as a result of the separation of the latter, in each case by virtue of perforation and punching carried out transversely to the web-running direction. In a manner offset in the web-running direction in relation to the predetermined separating locations, an additional separating line is formed in each unit, in the release paper serving as substrate layer, beneath each luggage tag by virtue of perforation, or a non-continuous cut, carried out transversely to the web-running direction.

When the web is finished off to give stacks with zigzag folding or rolls, the laminate web runs through a reading unit for the RFID transponder, and luggage tags with inoperable RFID transponders are marked out for the removal of said units from the web. Using the method steps according to the invention, the marked-out units are then removed from the web and the split web is joined together again.

The step sequence is (i), (iii), (ii), (iv) and (v) or (ii), (iv), (i), (iii) and (v). The laminate webs obtained in this way have 3% of defective units or less.

| | |
|---|---|
| 1 | Laminate web |
| 2,2a,2b | Units |
| 3,3a,3b | Predetermined separating locations |
| 4 | Substrate layer |
| 5 | Label, tag, admission pass |
| 6 | Additional, prepared separating line which is offset in the web-running direction in relation to the predetermined separating location |

What is claimed is:

1. In a laminate web including an elongate substrate, a plurality of identification elements serially arranged on said substrate in the longitudinal direction of said substrate, said plurality of identification elements detachably secured to said substrate, said identification elements defining transverse separating locations between adjacent identification elements, said substrate including a plurality of separating lines arranged transversely to said laminate web whereby said web may be separated at each said line, each said line offset by a distance from one said separating location in the longitudinal direction of said laminate web, said lines defining a plurality of segments of said substrate, a method for removing one of said identification elements and a said segment associated with said identification element, said method comprising:

a first step of identifying an identification element and an associated segment, said identified identification element having a first adjacent identification element and a first associated segment and a second adjacent identification element and a second associated segment;

a second step of severing said substrate along a first separating line located between said identified segment and said first associated segment;

a third step of severing said substrate along a second separating line located between said identified segment and said second associated segment;

a fourth step of peeling said identified associated segment away from said first adjacent identification element;

a fifth step of peeling said second associated segment away from said identified identification element;

a sixth step of removing said identified identification element and said associated segment from said laminate web; and a seventh step of attaching said second associated segment to said first identification element, whereby said laminate web is reassembled.

2. The method according to claim 1, wherein said separating line is formed in said substrate as one of a perforation and a non-continuous cut.

3. Laminate webs produced according to the method of claim 1.

4. The method according to claim 1, wherein said identification element comprises a data storage element.

5. The method according to claim 1 wherein said separating locations between adjacent identification elements comprise separating spaces.

6. An elongate spliced laminate web comprising:

first and second laminate webs each comprising a backing web and adhesively backed identification elements, wherein at least one said backing web includes a plurality of discontinuous cuts arranged transversely to the longitudinal direction of the web, the cuts defining a plurality of backing web segments;

at least one of said identification elements including a data storage element, said identification elements serially arranged on said backing webs and detachably secured thereto, wherein the elements have transverse separating locations between them, said backing web segments each having an associated detachably secured identification element, said discontinuous cuts and said separating locations offset from one another in the longitudinal direction of the web such that each identification element overlaps one of the discontinuous cuts and;

wherein one of the identification elements splices the two backing webs to form the spliced laminate web.

7. The laminate web according to claim 6, wherein the web comprises one of a roll and a stack with zigzag folding.

8. The laminate web according to claim 1 wherein said separating locations between adjacent identification elements comprise separating spaces.

* * * * *